(12) United States Patent
Kizaki et al.

(10) Patent No.: US 8,810,557 B2
(45) Date of Patent: Aug. 19, 2014

(54) DISPLAY DEVICE AND METHOD OF DRIVING THE SAME

(75) Inventors: Yukio Kizaki, Kawasaki (JP); Rei Hasegawa, Yokohama (JP); Hajime Yamaguchi, Kawasaki (JP); Hitoshi Nagato, Kunitachi (JP); Yukitami Mizuno, Tokyo (JP); Isao Amemiya, Machida (JP); Tomio Ono, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 194 days.

(21) Appl. No.: 13/040,868

(22) Filed: Mar. 4, 2011

(65) Prior Publication Data

US 2011/0205214 A1    Aug. 25, 2011

Related U.S. Application Data

(63) Continuation of application No. PCT/JP2009/064992, filed on Aug. 27, 2009.

(30) Foreign Application Priority Data

Sep. 4, 2008    (JP) .................................. 2008-227002

(51) Int. Cl.
*G06F 3/038*    (2013.01)
*G09G 5/00*    (2006.01)

(52) U.S. Cl.
USPC .......................................................... 345/211

(58) Field of Classification Search
CPC .... G09G 3/3433; G09G 3/344; G09G 3/3446
USPC ........................................................ 345/211
See application file for complete search history.

(56) References Cited

U.S. PATENT DOCUMENTS 4,757,235 A * 7/1988 Nunomura et al. ............ 313/509
4,822,144 A * 4/1989 Vriens ............................. 349/71
(Continued)

FOREIGN PATENT DOCUMENTS

JP    10-135540    5/1998
JP    2006-225590    8/2006
(Continued)

OTHER PUBLICATIONS

International Search Report issued Oct. 6, 2009 in Japanese Patent Application No. PCT/JP2009/064992 (with English Translation).

(Continued)

*Primary Examiner* — Joe H Cheng
*Assistant Examiner* — Michael J Jansen, II
(74) *Attorney, Agent, or Firm* — Oblon, Spivak, McClelland, Maier & Neustadt, L.L.P.

(57) ABSTRACT

According to one embodiment, a display device includes a first substrate, a second substrate, a first electrode, a second electrode, a partition electrode, a luminescent layer and a voltage source. The luminescent layer includes a luminescent material emitting light rays due to an electrochemical oxidation or reduction reaction thereof. The voltage source is configured to generate a driving voltage between the first and second electrodes so as to apply first and second potentials, wherein the first and second potentials are maintained at one and opposite polarities in respect to the reference potential during a predetermined segment period respectively and are periodically reversed, each of the first and second potentials is changed first to second absolute levels during the predetermined segment period, the second absolute potential is determined depending on the gradation of input image data, and the first absolute potential is higher than the second absolute potential.

3 Claims, 7 Drawing Sheets

(56) References Cited

U.S. PATENT DOCUMENTS

| | | | |
|---|---|---|---|
| 4,983,957 A * | 1/1991 | Ishikawa et al. | 359/265 |
| 5,099,356 A * | 3/1992 | Ohsawa et al. | 359/270 |
| 5,232,574 A * | 8/1993 | Saika et al. | 204/418 |
| 5,999,150 A * | 12/1999 | Nighan et al. | 345/79 |
| 6,346,775 B1 * | 2/2002 | Lee et al. | 315/169.3 |
| 6,373,187 B1 * | 4/2002 | Nagayama et al. | 313/506 |
| 6,639,580 B1 * | 10/2003 | Kishi et al. | 345/107 |
| 7,002,723 B2 * | 2/2006 | Enomoto et al. | 359/273 |
| 7,042,626 B2 * | 5/2006 | Katase | 359/296 |
| 7,084,853 B2 * | 8/2006 | Shinozaki et al. | 345/105 |
| 8,120,835 B2 * | 2/2012 | Jang et al. | 359/296 |
| 2002/0079795 A1 * | 6/2002 | Son | 313/45 |
| 2003/0043316 A1 * | 3/2003 | Matsumoto et al. | 349/84 |
| 2003/0205763 A1 * | 11/2003 | Park et al. | 257/359 |
| 2003/0222575 A1 * | 12/2003 | Yamazaki et al. | 313/504 |
| 2004/0021413 A1 * | 2/2004 | Ito et al. | 313/504 |
| 2004/0069986 A1 * | 4/2004 | Park et al. | 257/40 |
| 2004/0100191 A1 * | 5/2004 | Park | 313/506 |
| 2004/0142624 A1 * | 7/2004 | Son | 445/24 |
| 2005/0087448 A1 * | 4/2005 | Takahashi | 205/334 |
| 2005/0117192 A1 * | 6/2005 | Enomoto et al. | 359/265 |
| 2005/0179642 A1 * | 8/2005 | Wilcox et al. | 345/107 |
| 2005/0189872 A1 * | 9/2005 | Park et al. | 313/500 |
| 2006/0082588 A1 * | 4/2006 | Mizuno et al. | 345/558 |
| 2006/0097982 A1 * | 5/2006 | Arai et al. | 345/105 |
| 2006/0119568 A1 * | 6/2006 | Ikeda | 345/107 |
| 2006/0145605 A1 * | 7/2006 | Park | 313/506 |
| 2006/0181488 A1 * | 8/2006 | Kishi et al. | 345/60 |
| 2006/0285195 A1 * | 12/2006 | Moriyama et al. | 359/296 |
| 2007/0046587 A1 * | 3/2007 | Takahara | 345/76 |
| 2007/0066179 A1 * | 3/2007 | Nakamura et al. | 445/46 |
| 2007/0070003 A1 * | 3/2007 | Nakamura et al. | 345/87 |
| 2007/0109218 A1 * | 5/2007 | Saito et al. | 345/55 |
| 2008/0136984 A1 | 6/2008 | Yokoyama | |
| 2009/0243502 A1 * | 10/2009 | Kizaki et al. | 315/246 |
| 2010/0091352 A1 * | 4/2010 | Kokeguchi et al. | 359/268 |

FOREIGN PATENT DOCUMENTS

| | | |
|---|---|---|
| JP | 2007-139899 | 6/2007 |
| JP | 2008-078027 | 4/2008 |
| JP | 2008-084644 | 4/2008 |
| JP | 2008-145993 | 6/2008 |

OTHER PUBLICATIONS

International Written Opinion issued Oct. 6, 2009 in Japanese Patent Application No. PCT/JP2009/064992.
U.S. Appl. No. 13/048,918, filed Mar. 16, 2011, Kizaki, et al.
International Preliminary Report on Patentability and Written Opinion of the International Searching Authority Issued Apr. 12, 2011 in PCT/JP2009/064992 (English translation).

* cited by examiner

DISPLAY DEVICE AND METHOD OF DRIVING THE SAME

CROSS REFERENCE TO RELATED APPLICATIONS

This is a Continuation Application of PCT Application No. PCT/JP2009/064992, filed Aug. 27, 2009, which was published under PCT Article 21(2) in Japanese.

This application is based upon and claims the benefit of priority from Japanese Patent Application No. 2008-227002, filed Sep. 4, 2008; the entire contents of which are incorporated herein by reference.

FIELD

Embodiments described herein relate generally to a display device utilizing electrochemi-luminescence and a method of driving the display device.

BACKGROUND

An organic electroluminescence (EL) display device enables full color display and thinner design and therefore is expected to be applied to a display device. However, the organic EL display device has various drawbacks resulting from the injection of electric charges. For example, since a direct-current voltage is applied to the organic EL display device for driving, this causes the problem of shortening the service life of the device because impurities accumulate on one electrode. To overcome these drawbacks, a display device utilizing electrochemi-luminescence (ECL) has been developed, wherein a chemical reaction is induced by applying a voltage to the display device, thereby enabling the display device to chemically emit light. Since the display device utilizing ECL (hereinafter, referred to as ECL display device) can also be driven by an alternating-current voltage, the above problem can be avoided.

Since a luminescent layer of the ECL display device includes a liquid having fluidity, a luminescent material included in the luminescent layer is liable to circulate as compared with an organic EL display device where a luminescent layer is constituted by a solid material. Therefore, a fixed point defect, such as burn-in, is less liable to occur and the ECL display device generally has high reliability. Further, the ECL display device has a mono-layer structure which includes a solution including the luminescent material producing ECL, and electrodes for applying a voltage to the solution. Unlike the organic EL display device, the ECL display device need not laminate a charge transporting layer on the electrodes. Therefore, the ECL display device can be manufactured at lower cost. Furthermore, the ECL display device can be driven at lower voltage according to the principle based on electrochemical reactions.

In the case of an ordinary display device, the optical characteristic thereof can be controlled by applying a potential difference between two electrodes. On the other hand, in the case of the ECL display device, since an electrochemical reaction is utilized to emit light, it is required to control the optical characteristic thereof by accurately applying an oxidation-reduction potential of the luminescent material to electrodes. In the case of a two-electrode system, when a potential difference is applied between electrodes, it is impossible to directly measure an electric potential at each of the electrodes. Therefore, to apply an appropriate electric potential to each of the electrodes, it is required to provide a reference electrode which indicates a specific electrode reaction and has well-known electric potential, and control the electric potential of each electrode by measuring the potential difference between the reference electrode and each electrode.

JP-A 10-135540 (KOKAI) discloses an electrochemi-luminescence cell including a solution of an electrochemi-luminescent material, electrodes for applying an electric potential to the solution, and a reference electrode which is maintained to have a reference potential. However, JP-A 10-135540 (KOKAI) has not concretely described a method of driving the electrochemi-luminescence cell.

Such a conventional display device has the problem of permitting luminance to decrease, be made uneven, and the like when the polarity of a voltage is reversed. Therefore, it is required that there will be provided a display device which is capable of stable potential control and whose pixel units are reliable and a method of driving the display device.

DETAILED DESCRIPTION

In general, according to one embodiment, a display device includes a first substrate, a second substrate, a first electrode, a second electrode, a partition electrode, a luminescent layer and a voltage source. The first electrode and a second electrode are arranged on the first substrate and insulated from each other. The second substrate is arranged opposite to the first substrate. The partition electrode is arranged between the first and second substrates to define a space between the first and second substrates and maintained to have a reference potential. The luminescent layer is provided in the space and includes a luminescent material emitting light rays due to an electrochemical oxidation or reduction reaction thereof. The voltage source is configured to generate a driving voltage between the first and second electrodes so as to apply first and second potentials, wherein the first and second potentials are maintained at one and opposite polarities in respect to the reference potential during a predetermined segment period respectively and are periodically reversed, each of the first and second potentials is changed first to second absolute levels during the predetermined segment period, the second absolute potential is determined depending on the gradation of input image data, and the first absolute potential is higher than the second absolute potential.

Hereinafter, display devices and methods of driving the display devices according to various embodiments will be described with reference to the accompanying drawings.

Figure 1:
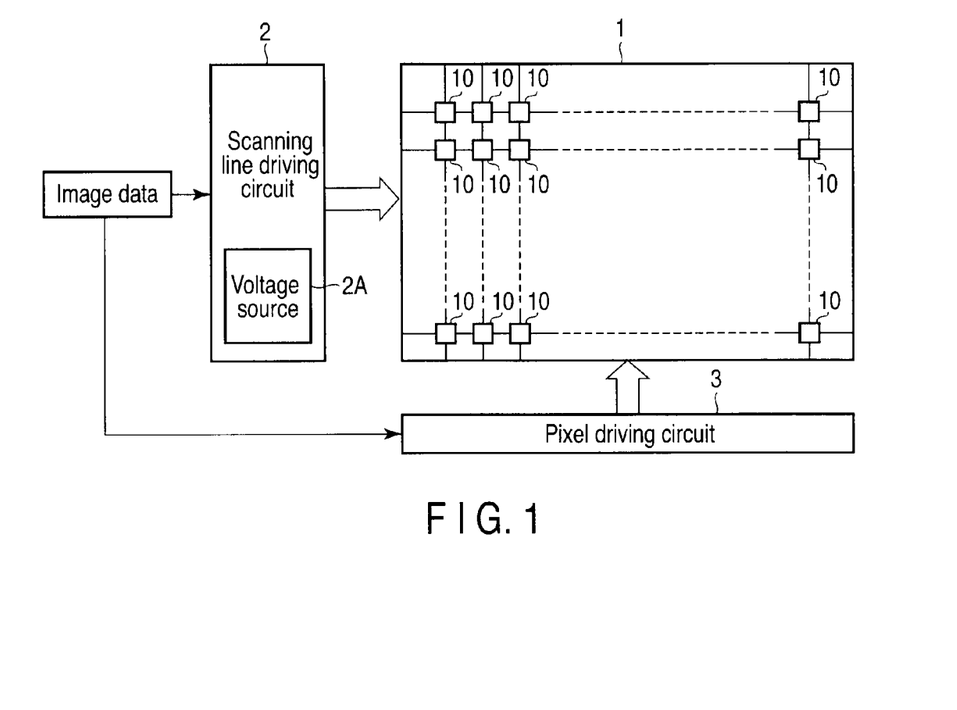
FIG. 1 is a block diagram schematically showing a display device according to one embodiment.

FIG. 1 schematically shows a display device according to one embodiment. The display device includes a display unit 1. The display unit 1 includes a plurality of pixel units 10 which are arranged in a matrix on a substrate. In the display unit 1, scanning lines are hard-wired to the rows of the pixel units 10 arranged in a matrix, respectively. The scanning lines are connected to a scanning line driving circuit 2. The scanning line driving circuit 2 includes a voltage source 2A which generates a driving voltage for driving each of the pixel units 10. When an image signal is input to the scanning line driving circuit 2, the driving circuit 2 applies driving voltages to the scanning lines according to the image signal, respectively, thereby selecting pixel units 10 in each row. Further, in the display unit 1, signal lines are hard-wired to the columns of the pixel units 10 arranged in a matrix, respectively. The signal lines are connected to a pixel driving circuit 3. When an image signal is input to the pixel driving circuit 3, the pixel units 10 are driven and controlled on a signal line basis according to the image signal. Accordingly, when an image signal is input to the scanning line driving circuit 2 and pixel driving circuit 3, the individual pixel units 10 are driven according to the image signal, thereby emitting light.

Figure 2:
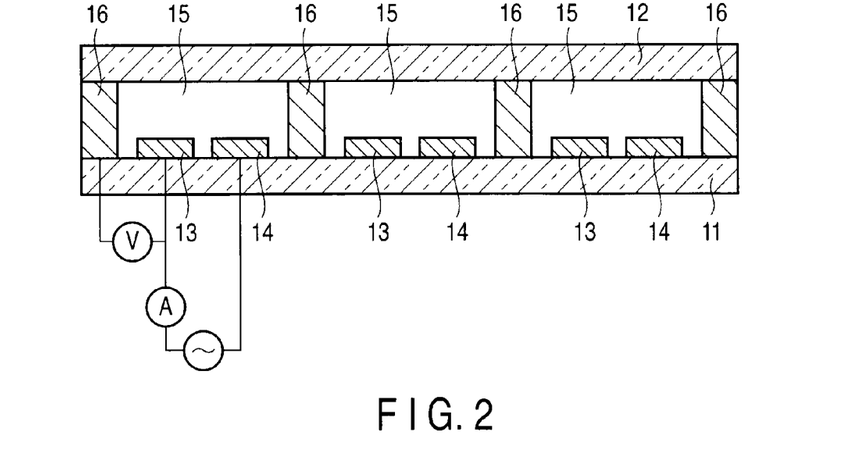
FIG. 2 is a sectional view schematically showing a pixel unit shown in FIG. 1.

FIG. 2 schematically shows one of the pixel units 10 shown in FIG. 1. The pixel unit 10 shown in FIG. 2 includes a first substrate 11. A first electrode 13 and a second electrode 14 are arranged on the first substrate 11 and are insulated from each other. The first electrode 13 and the second electrode 14 are formed so as to have the same size, that is, the same dimensions. The pixel unit 10 further includes a second substrate 12 arranged opposite to the first substrate 11 and a partition electrode 16. The partition electrode 16 is provided as a spacer to partition a luminescent layer 15 and holds the first substrate 11 and the second substrate 12 almost in parallel in such a manner that they are separated from each other. The partition electrode 16 acts as a reference electrode which is not directly involved in electrochemical luminescent reactions and has a reference potential. The reference electrode is grounded to keep their electric potential always constant. The reference electrode is made of stable material to electrolytic solution or the like, such as silver/silver chloride (Ag/AgCl).

A luminescent material and a solution including an electrolyte are encapsulated as the luminescent layer 15 in a space enclosed with the first substrate 11, second substrate 12, and partition electrode 16. The luminescent material includes an electrochemi-luminescence (ECL) material, i.e., a material that has the property of emitting light rays due to an electrochemical oxidation or reduction reaction thereof. Further, the luminescent layer 15 includes chloride ions ($Cl^-$) to cause the partition electrode 16 to function as the reference electrode.

Figure 3:
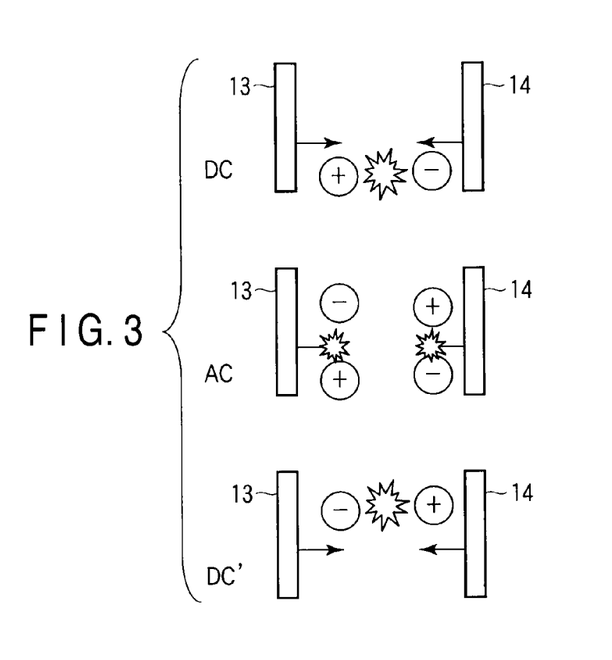
FIG. 3 is a schematic diagram to explain the way electrochemi-luminescent reaction takes place when a direct-current, an alternating-current, or a pseudo-alternating-current voltage is applied between a first electrode and a second electrode shown in FIG. 2.

As shown in FIG. 3, in the luminescent layer 15, when a voltage is applied between the first electrode 13 and the second electrode 14, the ECL material is oxidized near one electrode (anode), thereby generating oxidized species, i.e., cation radicals. In addition, the ECL material is reduced near the other electrode (cathode), thereby generating reduced species, i.e., anion radicals. The cation radicals and anion radicals move in the solution and associate with one another, producing the ECL material in the excited state. The ECL material emits light when it is deactivated from the excited state. Use of this phenomenon enables the pixel unit 10 driven according to an image signal to emit light. Generally, in a display device that emits light by applying a voltage to a solution including an ECL material, a voltage to be applied may be either a direct-current voltage or an alternating-current voltage. When the pixel unit is driven by a direct-current (DC) voltage, for example, if cation radicals are generated at the first electrode 13 as shown in FIG. 3, the cation radicals move toward the second electrode 14. At this time, anion radicals are generated at the second electrode 14 and move toward the first electrode 13. During the motion, the cation radicals and anion radicals associate with one another, thereby emitting light. When the pixel unit is driven by an alternating-current (AC) voltage, cation radicals and anion radicals are generated alternately at each electrode and therefore reactions occur near each electrode.

Figure 4:
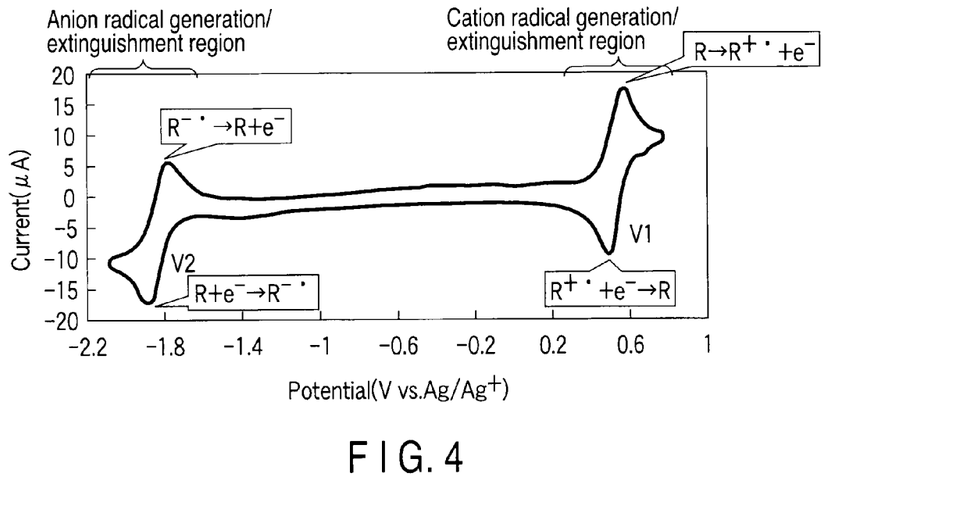
FIG. 4 is a graph showing the relationship between an electric potential and a current at which anion radicals and cation radicals are generated or extinguished in the pixel unit shown in FIG. 2.

As described above, even when the polarity is not reversed, that is, even when driving is performed with a direct-current voltage, luminescent display can be performed. However, ionic impurities included in the ECL material accumulate at one electrode, which decreases the reliability of the pixel unit 10. When driving is performed with an alternating-current voltage whose frequency is high, for example, if the electric potential of the first electrode 13 is reversed between V1 and V2 periodically, a reverse reaction whereby the ECL material returns from the anion radicals to the original and a reverse reaction whereby the ECL material returns from the cation radicals to the original may take place, as shown in FIG. 4. This decreases the reaction efficiency. In addition, since electric power is required to charge an electric double layer capacitor, this leads to an increase in the power consumption. Accordingly, in the display device shown in FIG. 1, a pseudo-direct-current voltage (an alternating-current voltage whose frequency is low) is applied between the first electrode 13 and the second electrode 14, thereby causing the ECL material of the luminescent layer 15 to emit light. When the pixel unit 10 is driven by a pseudo-direct-current (DC') voltage, although a behavior similar to that in direct-current driving is observed as shown in FIG. 3, the electrodes at which anion radicals and cation radicals are generated are replaced with each other periodically.

It is desirable that the luminescent layer 15 should further include supporting salt to make it easier for the oxidation reaction-reduction reaction of the ECL material to take place.

Next, a method of driving the pixel unit 10 shown in FIG. 2 will be described with reference to FIGS. 5A to 7C. As described above, in the pixel unit 10 shown in FIG. 2, a pseudo-direct-current voltage is applied between the first electrode 13 and the second electrode 14. The polarity of at least a part of the voltage is reversed periodically. When the polarity is reversed, a voltage whose absolute level is higher than that of a voltage applied according to the gradation of image data, i.e., a voltage whose absolute level is higher than that of a voltage applied to obtain desired luminance is applied to the luminescent layer 15.

Figure 5A:
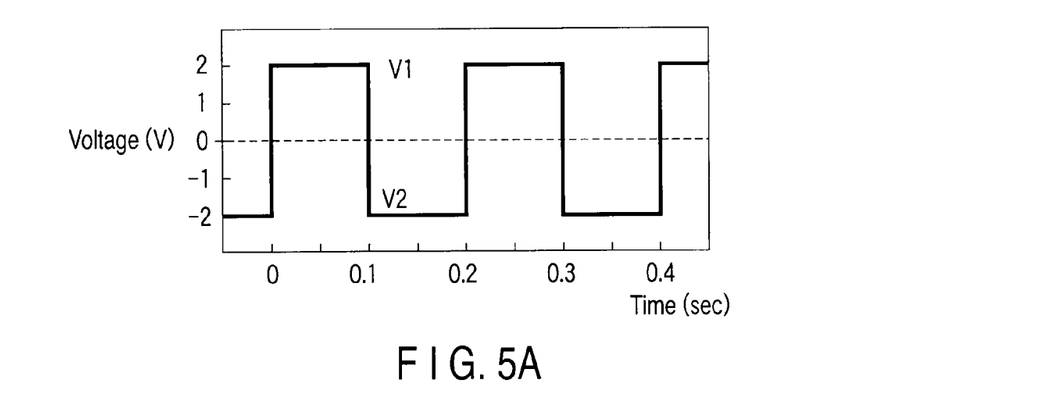
FIG. 5A is a graph schematically showing a conventional driving voltage applied to the pixel unit shown in FIG. 2.
Figure 5B:
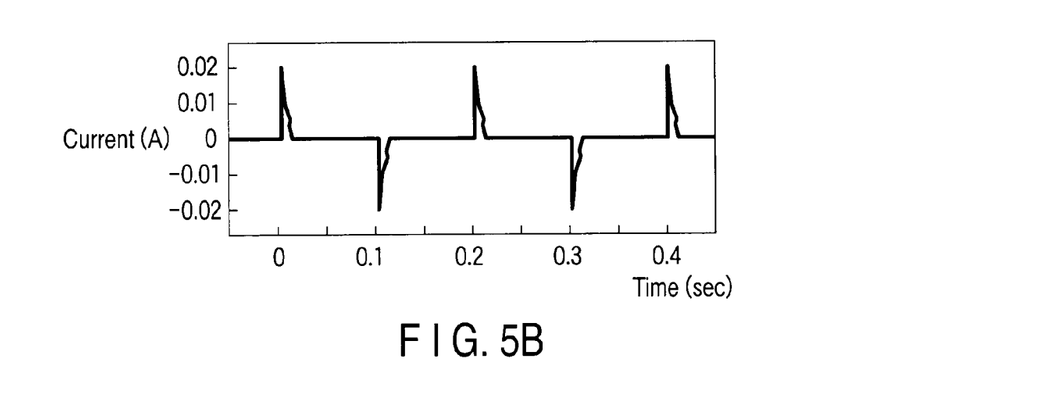
FIG. 5B is a graph schematically showing the change of value of current flowing through the first electrode with respect to time when a driving voltage shown in FIG. 5A is applied to the pixel unit shown in FIG. 2.
Figure 5C:
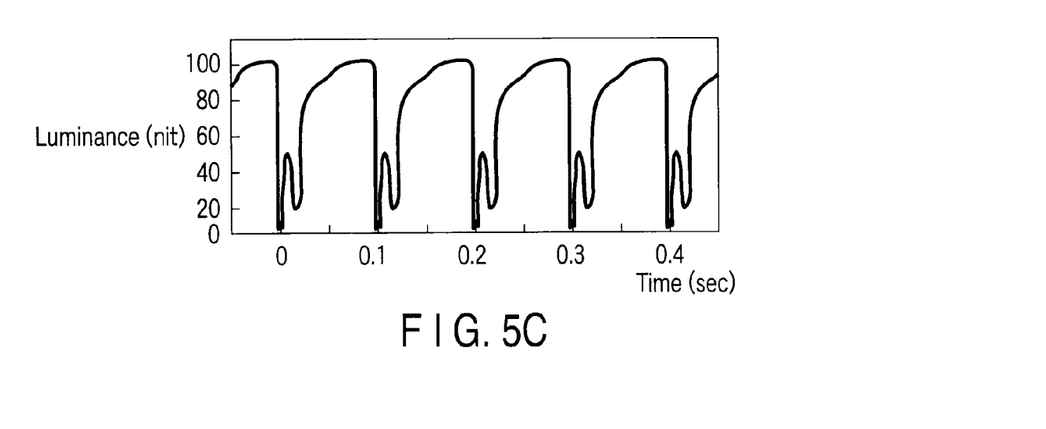
FIG. 5C is a graph schematically showing the change of luminance of the display device with respect to time when a driving voltage shown in FIG. 5A is applied to the pixel unit shown in FIG. 2.

FIG. 5A shows a conventional rectangular driving voltage to be applied to the first electrode 13. FIGS. 5B and 5C schematically show the current value of the first electrode 13 and the light-emitting luminance of the pixel unit 10, respectively, when a driving voltage shown in FIG. 5A is applied. Although not shown in the drawings, during period of luminous state, the electric potential of the second electrode 14 with respect to the partition electrode 16 has the reverse polarity of the first electrode 13. For example, as shown in FIG. 5A, while a voltage is applied to the first electrode 13 in such a manner that the electric potential of the first electrode 13 becomes V1 and V2 by turns, a voltage whose polarity is the reverse of that of the above voltage is applied to the second electrode 14. Here, V1 is a positive oxidation potential at which the ECL material is oxidized to generate cation radicals, and V2 is a negative reduction potential at which the ECL material is reduced to generate anion radicals. When such a driving voltage is applied between the first electrode 13 and the second electrode 14, anion and cation radicals of the ECL material are generated alternately near the first electrode 13 and the second electrode 14. Then, the anion radicals and cation radicals associate with one another, generating an ECL material in the excited state. When the ECL material is deactivated, luminescence takes place. With no driving voltage applied, the pixel unit 10 emits no light. However, as shown in FIG. 5C, when a driving voltage shown in FIG. 5A is applied, the luminance drops for a second as a result of a fluctuation in the amount of light due to an unstable state immediately after the reversal of polarity.

Figure 6:
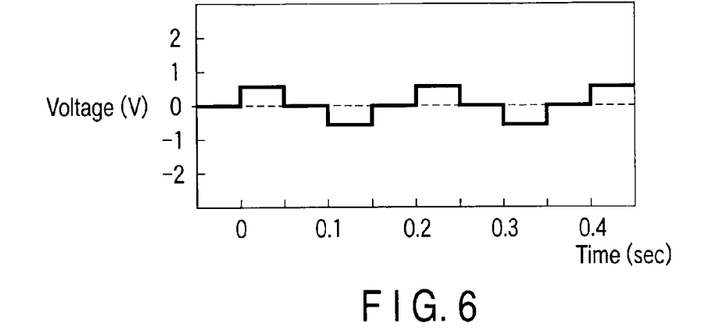
FIG. 6 is a graph schematically showing an auxiliary voltage in the voltage source shown in FIG. 1.
Figure 7A:
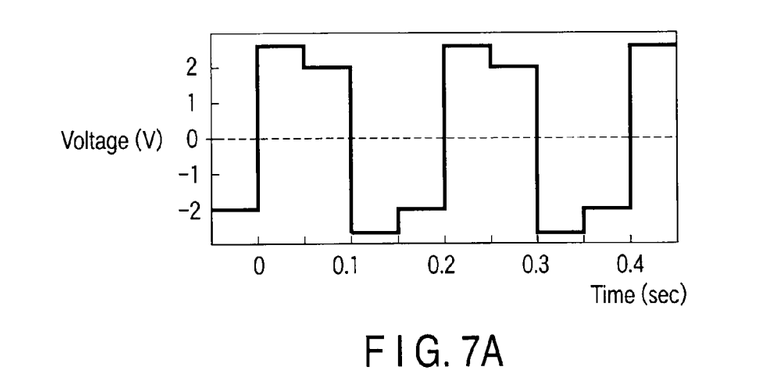
FIG. 7A is a graph schematically showing a driving voltage applied to the pixel unit shown in FIG. 1.
Figure 7B:
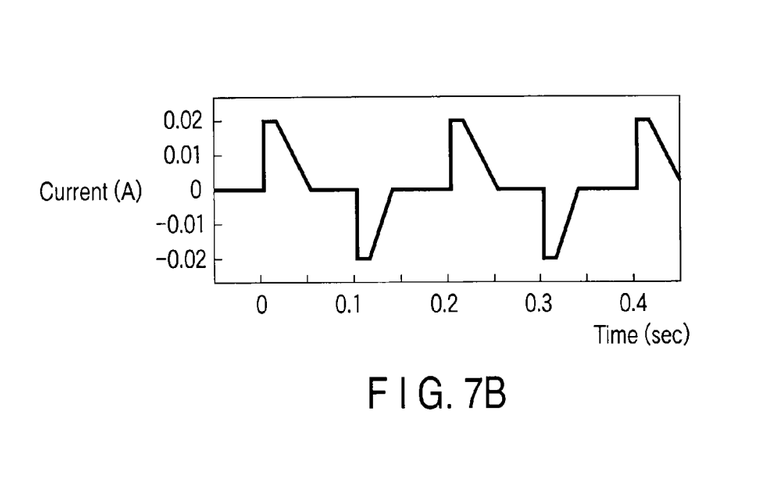
FIG. 7B is a graph schematically showing the change of value of current flowing through the first electrode with respect to time when a driving voltage shown in FIG. 7A is applied to the pixel unit shown in FIG. 2.
Figure 7C:
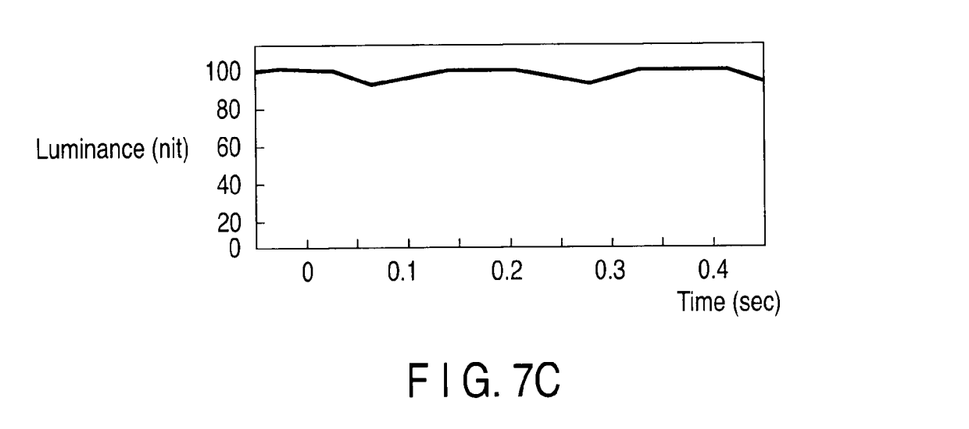
FIG. 7C is a graph schematically showing the change of luminance of the display device with respect to time when a driving voltage shown in FIG. 7A is applied to the pixel unit shown in FIG. 2.

To prevent the luminance from dropping, the voltage source 2A of the scanning line driving circuit 2 shown in FIG. 1 includes an auxiliary voltage source for applying a voltage higher than the driving voltage shown in FIG. 5A when the polarity is reversed. The auxiliary voltage source generates an auxiliary voltage as shown in FIG. 6. As a result, the voltage source 2A generates the driving voltage shown in FIG. 7A. As shown in FIG. 7A, the driving voltage is higher than oxidation potential V1 immediately after the driving voltage is reversed in polarity from reduction potential V2 to oxidation potential V1. That is, the driving voltage is changed from the electric potential which is higher than oxidation potential V1 to oxidation potential V1 during a segment period after the driving voltage is reversed in polarity from reduction potential V2 to oxidation potential V1. In addition, immediately after the driving voltage is reversed in polarity from oxidation potential V1 to reduction potential V2, the driving voltage is lower than reduction potential V2. That is, the driving voltage is changed from the electric potential which is lower than reduction potential V2 to reduction potential V2 during a segment period after the driving voltage is reversed in polarity from oxidation potential V1 to reduction potential V2. FIGS. 7B and 7C schematically show the current value of the first electrode 13 and the light-emitting luminance of the pixel unit 10 when a driving voltage shown in FIG. 7A is applied. The pixel unit 10 of the embodiment is driven by applying the driving voltage shown in FIG. 7A, i.e., the overdrive voltage. This reduces a fluctuation in the amount of light, preventing the luminance from decreasing as shown in FIG. 7C. The period with which polarity is reversed may be set to 30 milliseconds to 3 minutes. The reversal of polarity is switched randomly on a scanning line basis. Alternatively, the phase of the driving voltage is shifted scanning line by scanning line. This prevents fine flickering or flickers from taking place in the display unit 1.

Figure 8:
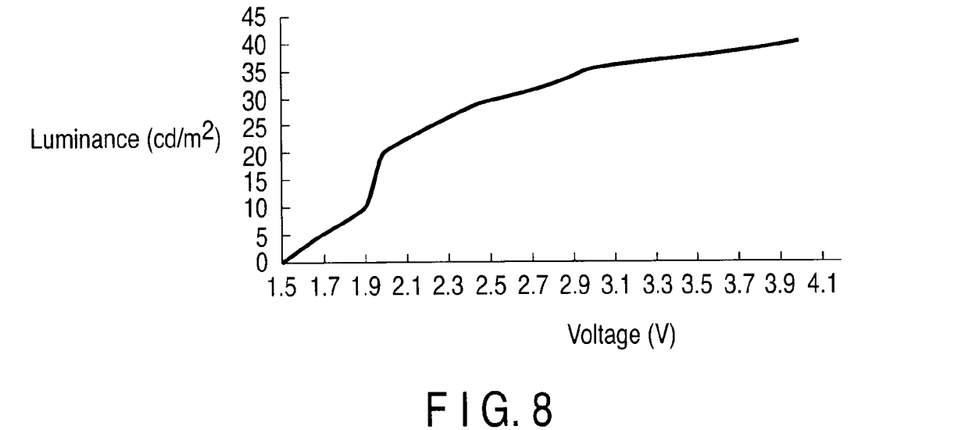
FIG. 8 is a graph showing the relationship between a voltage applied to an ECL material and luminance.
Figure 9:
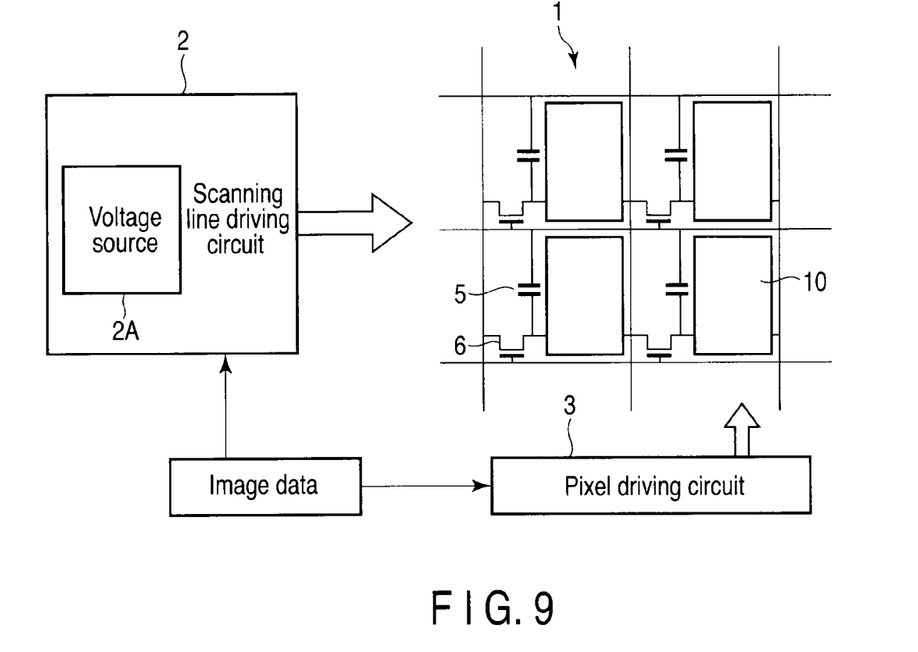
FIG. 9 schematically shows a configuration of the driving circuit of the pixel unit shown in FIG. 1.

Gradation display of the display device shown in FIG. 1 is, for example, implemented as described below. In the display device shown in FIG. 1, multiple gradation display is realized by combining modulation by a voltage applied to the luminescent layer 15 with modulation by the number of light emissions. FIG. 8 shows the relationship between a voltage applied to the luminescent layer 15 including the ECL material and the light-emitting luminance. As shown in FIG. 8, multiple gradation display by a voltage modulation method requires the rising of the luminance-voltage characteristic of the pixel unit 10 to have a certain inclination, not a sharp inclination. However, for example, when an attempt is made to realize a display with, for example, 128 shades of gray only by the voltage modulation method, it is difficult to adjust the voltage. Therefore, combining the voltage modulation method with the modulation method based on the number of light emissions enables images to be displayed with multiple gradation. In such multiple gradation display, the minimum luminance is set as gray level 1 and gray levels increasing at twice the preceding level are produced by voltage modulation. Specifically, gray levels 1, 2, 4, 8, 16 are produced by voltage modulation. In each of the gray levels, the number of light emissions is limited to a plural number, for example, two. In an active-matrix display device, a circuit that includes a capacitor 5 and a TFT 6 is provided for each of the pixel units 10 of the display unit 1 as shown in FIG. 9. On/off data and gradation data are stored in the capacitor 5 via scanning lines and signal lines. According to the gradation data, each of the pixel units 10 of the display unit 1 emits light. Accordingly, the number of light emissions at the pixel unit 10 can be controlled by one data write operation.

Practical voltage values that realize the gray levels differ, depending on the ECL material included in the luminescent layer 15. The number of light emissions is changed to 4, 8, 16 on the assumption that a voltage corresponding to a display with gray level 16 is applied, thereby realizing gray levels 32, 64, 128. When multiple gradation display is performed only by control of the number of light emissions, pulses corresponding to 128 shades of gray must be applied within a time period of one frame. Therefore, it is difficult to realize multiple gradation display only by control of the number of light emissions. However, in gradation display with the aforementioned voltage by control of the number of light emissions, the maximum number of light emissions in a time period of one frame (16.7 msec) is 38, which shortens the time required to emit light than when gradation display is performed only by the number of light emissions.

The voltage applied according to the gradation of image data denotes a voltage applied according to each of the gray levels.

Next, the material of each component of the pixel unit 10 shown in FIG. 2 will be described. If an observation surface (or a display surface) is on the first substrate 11 side, the first substrate 11 is made of a transparent material or a material that absorbs less light in the visual light range. Examples of the transparent material include glass, plastic (PED, PEN, PES, or PC), etc.

The first electrode 13 and the second electrode 14 mounted on the first substrate 11 are made of a transparent electrode material. Examples of the transparent electrode material include metal-oxide semiconductors such as oxides of transition metals such as titanium, zirconium, hafnium, strontium, zinc, tin, indium, yttrium, lanthanum, vanadium, niobium, tantalum, chromium, molybdenum, and tungsten. As the transparent electrode material, it is possible to employ perovskite such as $SrTiO_3$, $CaTiO_3$, $BaTiO_3$, $MgTiO_3$, $SrNB_2O_6$, etc. Alternatively, the transparent electrode material may be composite oxides or oxide mixtures of aforementioned materials, GaN, or the like. If the second substrate 12 is used as an observation surface, the first electrode 13 and the second electrode 14 need not be transparent and can be made of Al, Ag, or the like. The first electrode 13 and the second electrode 14 should preferably be as large as possible to increase the aperture ratio. Further, the first electrode 13 and the second electrode 14 should preferably be made of the same material with the same size.

The second substrate 12, which is not used as an observation surface, may be made of the same material of the first substrate 11. If the observation surface is on the second substrate 12 side, the second substrate 12 should preferably be made of a material that absorbs less light in the visual light range.

AS the ECL material of the luminescent layer 15, it is possible to employ polycyclic aromatic compounds, such as naphthacene derivatives (rubrene, 5,12-diphenylnaphthacene), anthracene derivatives (9,10-diphenylanthracene), pentacene derivatives (6,10-diphenyl pentacene), and periflanthene derivatives (dibenzotetra (methylphenyl) periflanthene), π-electronic conjugated macromolecule compounds, such as polyparaphenylenvinylene derivatives, polythiophene derivatives, polyparaphenylen derivatives, and polyfluorene derivatives, hetero aromatic compounds such as coumalin, chelate metal complexes such as $Ru(bpy)_3^{2+}$, organometallic compounds such as tris (2-phenylpyridine) indium, chelatelanthanoid complexes, etc.

The solution injected into the luminescent layer 15 preferably includes supporting salt for facilitating the oxidation-reduction reaction of the ECL material. If the solution includes supporting salt, the solution should preferably include a solvent (for liquid electrolyte) for dissociating the supporting salt into ions or gel polymers (for solid electrolyte) swelled by the solvent.

As the supporting salt, it is possible to employ tetrabutylammonium perchlorate, potassium hexafluorophosphate, lithium trifluorometasulfonate, lithium perchlorate, tetrafluoroborate tetra-n-butylammonium, tripropyl amine, and tetra-n-butylammonium fluoroborate, etc.

As the solvent, it is possible to employ acetonitrile, N,N-dimethylformamide, propylene carbonate, o-dichlorobenzene, glycerin, water, ethyl alcohol, propyl alcohol, dimethylcarbonate, ethylene carbonate, γ-butyrolactone, NMP, 2-methyltetrahydrofuran, toluene, tetrahydrofuran, benzonitrile, cyclohexane, n-hexane, acetone, nitrobenzene, 1,3-dioxolan, furan, benzotrifluoride, etc.

As the gel polymers, it is possible to employ polyacrylonitrile (PAN), a copolymer of vinylidene fluoride (VDF) and hexafluoropropylene (HFP), and polyethylene oxide (PEO), etc.

A method of forming the luminescent layer 15 is to dissolve supporting salt and ECL material into the solvent and inject the resulting solvent into a space between the first substrate 11 on which the first electrodes 13 and the second electrodes 14 are arranged and the second substrate 12. The luminescent layer 15 includes chloride ions ($Cl^-$) for causing the partition electrode 16 to function as reference electrode. The partition electrode 16 is formed by a method of applying silver paste onto the first substrate 11 by screen printing or the like.

Figure 10:
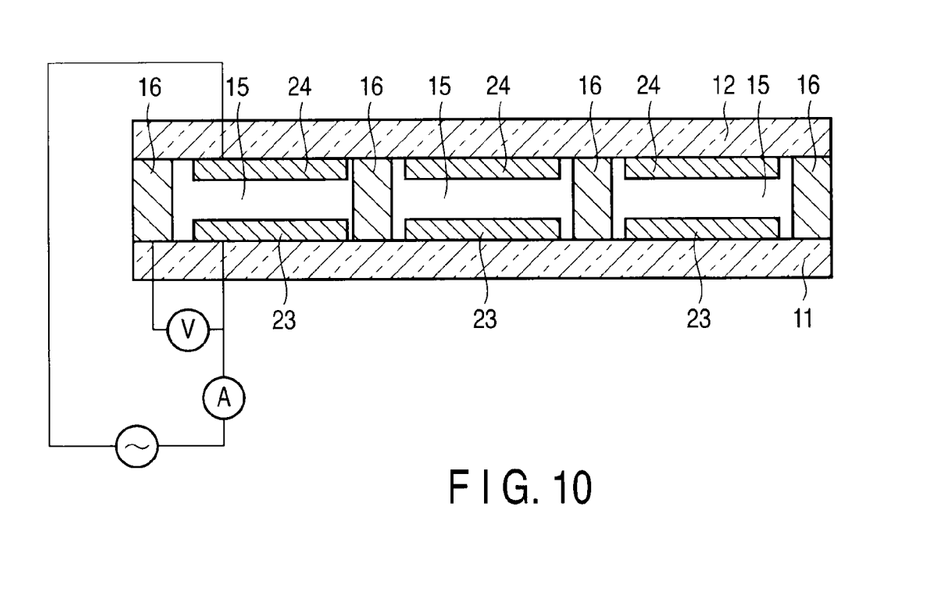
FIG. 10 is a sectional view schematically showing a modification of the pixel unit shown in FIG. 2.

FIG. 10 schematically shows a modification of the pixel unit 10 of the display device according to the embodiment. As shown in FIG. 10, in this pixel unit 10, a first electrode 23 is arranged on the first substrate 11 and a second electrode 24 are arranged on the second substrate 12 in such a manner that the first electrode 23 and the second electrode 24 are opposed to each other. The configuration excluding the installation locations of the electrodes 23 and 24 is the same as that of the above-described embodiment. In the pixel unit 10 shown in FIG. 10, a substrate and electrode on the observation surface side are made of a transparent material and preferably made of a material that absorbs less light in the visual light range.

As described above, the display device according to the embodiment includes the voltage source 2A which generates a driving voltage applied between the first electrode 13 and the second electrode 14. The driving voltage is a pseudo-direct-current voltage, i.e., an alternating-current voltage whose frequency is low. The driving voltage whose absolute level is higher than that of a voltage applied according to the gradation of image data is applied to the luminescent layer 15 during a predetermined period after the polarity of the driving voltage is reversed, enabling luminance decrease, luminance unevenness, and the like to be suppressed.

Next, examples of the display device according to the embodiment the inventors actually made will be described.

Example 1

A 2.5-inch-square display device was made as described below. In example 1, each pixel unit 10 was made so that it may have the same configuration as that of the pixel unit 10 shown in FIG. 2 and the size of one pixel unit 10 may be 100 μm square. A solvent including ECL material that emits light in monochrome was injected into the luminescent layer 15.

A 1.1-mm-thick glass substrate was used as the first substrate 11. An ITO film with a film thickness of 1000 Å was formed by sputtering techniques and then patterned, thereby forming the first electrodes 13 and the second electrodes 14. A glass substrate was used as the second substrate 12. Silver paste was formed as 20-μm-high partition electrode 16 on the first substrate 11 by screen printing. The first substrate 11 and the second substrate 12 were arranged so as to face each other with a 20-μm gap between them. The periphery of the substrates was fastened by epoxy resin, sealing adhesive, with a filling opening left, thereby producing a pixel unit 10.

10 mM (mM representing $10^{-3}$ mol/l) of $LiCF_3SO_3$, 90 mM of tetrabutylammonium perchlorate (TBAP), and 1 M of potassium chloride (chloride ion) used as supporting salt, and 10 mM of ruburene used as ECL material were dissolved into a solvent which was prepared in such a manner that orthodichlorobenzene (o-DCB) and acetonitrile (AN) are mixed with each other at a ratio of 3:1. Then, the resulting solvent was injected into the pixel unit 10, producing the luminescent layer 15.

When the partition electrode 16 was used as a reference electrode and a pseudo-direct-current voltage as shown in FIG. 6A was applied between the first electrode 13 and the second electrode 14, the emission of yellow light was observed and a stable operation was achieved without a fluctuation of the electric potential.

Comparative Example

As a comparative example of example 1, a 2.5-inch-square display device was made as described below.

Figure 11:
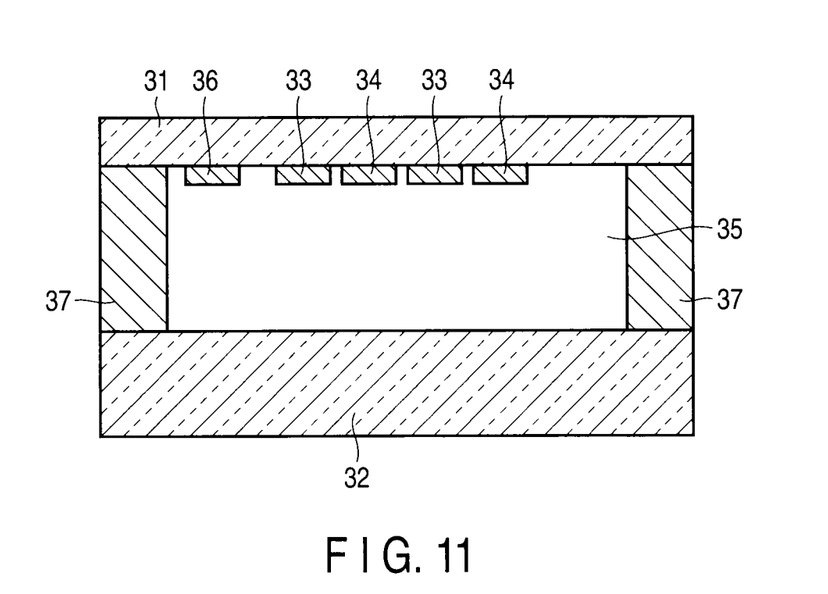
FIG. 11 is a sectional view schematically showing a pixel unit serving as a comparative example.

In the comparative example, shown in FIG. 11, a pixel unit was made so that the size of one pixel unit may be 100 μm square. A solvent including ECL material that emits light in monochrome was injected into a luminescent layer 35.

In the comparative example, as shown in FIG. 11, a 1.1-mm-thick glass substrate was used as a first substrate 31. An ITO film with a film thickness of 1000 Å was formed on the first substrate 31 by sputtering techniques and then patterned, thereby forming first electrodes 33 and the second electrodes 34. The first electrode 33 and the second electrode 34 were formed into a comb-like structure and arranged so that they may mesh with one another. An Ag film with a film thickness of 1000 Å was formed on the first substrate 31 by sputtering techniques and then patterned, producing a 20-µm-square reference electrode 36. A glass substrate was used as a second substrate 32. The first substrate 31 and the second substrate 32 were held with a spacer 37 so that there may be a 2-µm gap between them. Pixel units were glued together, producing a display device.

When an alternating-current voltage was applied between the first electrode 33 and the second electrode 34 of each of the pixel unit, the emission of yellow light was observed. In this comparative example, a 10% fluctuation in the luminance was observed.

Embodiment 2

A 2.5-inch-square display device was made as described below. In embodiment 2, each pixel unit 10 was made so that it may have the same configuration as that of the pixel unit 10 shown in FIG. 10 and the size of one pixel unit 10 may be 100 µm square. A solvent including ECL material that emits light in monochrome was injected into the luminescent layer 15.

A 1.1-mm-thick glass substrate was used as the first substrate 11. An ITO film with a film thickness of 1000 Å was formed by sputtering techniques and then patterned, thereby forming the first electrode 23. Similarly, a 1.1-mm-thick glass substrate was used as the second substrate 12. An ITO film with a film thickness of 1000 Å was formed by sputtering techniques and then patterned, thereby forming the second electrode 24. Silver paste was formed as 20-µm-high partition electrode 16 on the first substrate 11 by screen printing. The first electrode 23 and the second electrode 24 were arranged so as to face each other with a 10-µm gap between them. The periphery of the substrates was fastened by epoxy resin, sealing adhesive, with a filling opening left, thereby producing a pixel unit 10.

10 mM of $LiCF_3SO_3$, 90 mM of TBAP (tetrabutylammonium perchlorate), and 1 mM of potassium chloride (chloride ion) used as supporting salt, and 10 mM of ruburene used as ECL material were dissolved into a solvent which was prepared in such a manner that orthodichlorobenzene (o-DCB) and acetonitrile (AN) are mixed with each other at a ratio of 3:1. Then, the resulting solvent was injected into the pixel unit 10, producing the luminescent layer 15.

When the partition electrode 26 was used as a reference electrode and a pseudo-direct-current voltage as shown in FIG. 6A was applied between the first electrode 23 and the second electrode 24, the emission of yellow light was observed and a stable operation was achieved without a fluctuation of the potential.

In the display device and the method of driving the display device according to the embodiment, the polarity of a driving voltage to be applied is reversed periodically. Further, immediately after the driving voltage is reversed in polarity, an absolute level of the driving voltage is higher than that of a voltage applied according to the gradation of image data during a predetermined period. This enables stable voltage control and an increase in the pixel unit reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrochemical luminescence display device for displaying an image having a gradation depending on input image data, comprising:
   a first substrate;
   a first electrode and a second electrode arranged on the first substrate apart from each other;
   a second substrate arranged opposite to the first substrate;
   a partition electrode arranged between the first and second substrates to define a space between the first and second substrates, wherein the partition electrode is not involved in the electrochemical reactions and is maintained to have a constant reference potential to ground, and wherein the reference potential is a potential between a potential of the first electrode and a potential of the second electrode;
   a luminescent layer which is provided in the space and includes a luminescent material, wherein the luminescent layer emits light rays due to an electrochemical oxidation or reduction reaction of the luminescent material; and
   a voltage source configured to generate pseudo-direct-current voltage between the first and second electrodes so as to apply a first potential to the first electrode and a second potential to the second electrode, wherein the first and second potentials are maintained at one and opposite polarities in respect to the reference potential, each of the first and second potentials is periodically reversed in polarity, is changed from a first to a second level during a period when the polarity is positive, and is changed from a third level to a fourth level during a period when the polarity is negative, the second level and the fourth level are determined depending on the gradation of image data, the first level is higher than the second level to obtain desired luminance, and the third level is lower than the fourth level to obtain desired luminance.

2. A method of driving an electrochemical luminescence display device for displaying an image having a gradation depending on input image data, the display device including:
   a first substrate;
   a first electrode and a second electrode arranged on the first substrate apart from each other;
   a second substrate arranged opposite to the first substrate;
   a partition electrode arranged between the first and second substrates to define a space between the first and second substrates, wherein the partition electrode is not involved in the electrochemical reactions and is maintained to have a constant reference potential to ground, and wherein the reference potential is a potential between a potential of the first electrode and a potential of the second electrode; and
   a luminescent layer which is provided in the space and includes a luminescent material, wherein the luminescent layer emits light rays due to an electrochemical oxidation or reduction reaction of the luminescent material; the method comprising:

generating pseudo-direct-current voltage between the first and second electrodes so as to apply a first potential to the first electrode and second potential to the second electrode, wherein the first and second potentials are maintained at one and opposite polarities in respect to the reference potential, each of the first and second potentials is periodically reversed in polarity, is changed from a first level to a second level during a first period when the polarity is positive, and is changed from a third level to a fourth level during a second period when the polarity is negative, the second level and the fourth level are determined depending on the gradation of image data, the first level is higher than the second level to obtain desired luminance, and the third level is lower than the fourth level to obtain desired luminance.

3. The method according to claim 2, wherein each of the first period and the second period ranges from 30 milliseconds to 3 minutes.

* * * * *